(12) United States Patent
Diskin et al.

(10) Patent No.: US 10,028,487 B1
(45) Date of Patent: Jul. 24, 2018

(54) LAUNCHABLE PET TOY

(71) Applicant: Worldwise, Inc., San Rafael, CA (US)

(72) Inventors: Aimee Diskin, Napa, CA (US); Regina Chern, Danville, CA (US); Sara Paculdo, Novato, CA (US)

(73) Assignee: Worldwise, Inc., Novato, CA (US)

( * ) Notice: Subject to any disclaimer, the term of this patent is extended or adjusted under 35 U.S.C. 154(b) by 69 days.

(21) Appl. No.: 14/218,061

(22) Filed: Mar. 18, 2014

(51) Int. Cl.
*A01K 29/00* (2006.01)
*A01K 15/02* (2006.01)

(52) U.S. Cl.
CPC ............... *A01K 15/025* (2013.01)

(58) Field of Classification Search
USPC ............ 119/707, 708, 709, 710, 711, 702; 446/62, 63, 309, 308, 311, 369, 64, 61; 473/569
See application file for complete search history.

(56) References Cited

U.S. PATENT DOCUMENTS

| | | | | | |
|---|---|---|---|---|---|
| 2,621,441 | A | * | 12/1952 | Worden | 446/34 |
| 5,194,033 | A | * | 3/1993 | Wright | 446/311 |
| 5,240,448 | A | * | 8/1993 | Ishikawa | 446/64 |
| 5,282,777 | A | * | 2/1994 | Myers | 473/576 |
| 5,863,250 | A | * | 1/1999 | Harris | 463/34 |
| 6,808,437 | B2 | * | 10/2004 | Podd et al. | 446/320 |
| 2012/0125266 | A1 | * | 5/2012 | Ying | 119/707 |

* cited by examiner

*Primary Examiner* — Trinh T Nguyen
(74) *Attorney, Agent, or Firm* — Bay Area Technology Law Group PC

(57) ABSTRACT

A pet toy having a body which includes a head section and a tail section. A stretchable member extends from and is fixedly attached to the head section. This stretchable member is an elastomer having a web with first and second ends, the first end being appended to the head section and the second end transitioning to a loop, the loop having an opening sized to receive the finger of a user.

5 Claims, 1 Drawing Sheet

LAUNCHABLE PET TOY

TECHNICAL FIELD

The present invention is directed to a pet toy generally of the type having an outer shell and stuffing. The pet toy includes a stretchable member extending from its head section such that the body of the toy can be pulled back while a finger of a user is placed within a loop at an opposite end of the stretchable member for launching the toy proximate a pet for its amusement and exercise.

BACKGROUND OF THE INVENTION

Both dogs and cats require stimulation and, particularly as to dogs, also require exercise in order to maintain their health and wellbeing.

Dog owners can expend considerable time and effort in exercising their pets. The common game of fetch can be used for this purpose using either a stick, toy or ball which can be thrown or heaved whereupon most dogs will instinctively run to retrieve the thrown object only to bring it back to its owner to enable the process to repeat itself There have been a number of products which are specifically designed to assist in the throw and retrieve process. Most involve balls which are held in cup-like receivers on a shaft such that when the shaft is pulled behind a user's head, a whip-like action will release the ball generally a distance greater than its user is able to do so if unassisted. However, there have been no commercially available products which would facilitate the heaving of odd-shaped and stuffed toys.

In addition, cat owners, in stimulating their pets, oftentimes throw a stuffed toy in the vicinity of the pet which will instinctively pounce upon it if given the opportunity. Interaction with a cat is less focused on exercise as it is stimulation. Cats have an instinctual desire to chase other animals like birds and rodents and employing a pet toy as an alternative to instinctive hunting of wild animals is something generally sought after by those who keep cats as pets.

It is thus the object of the present invention to provide a launchable pet toy for both dogs and cats which can both stimulate and provide exercise as needed, all for the health and wellbeing of a domestic pet.

These and further objects will be readily apparent when considering the following disclosure and appended claims.

SUMMARY OF THE INVENTION

A pet toy comprising a body having a head section and a tail section and a stretchable member extending from and fixedly attached to said head section, said stretchable member being an elastomer comprising a web having first and second ends, said first end being appended to said head section and said second end transitioning to a loop, said loop having an opening sized to receive a finger of a user.

In addition, the present invention is to a method of launching a pet toy, said pet toy comprising a body having a head section and a tail section and a stretchable member extending from and fixedly attached to said head section, said stretchable member being an elastomer comprising a web having first and second ends, said first end being appended to said head section and said second end transitioning to a loop, said loop having an opening sized to receive a finger of a user, said method comprising inserting a finger of a user through said loop and pulling said body away from said loop to expand said web followed by releasing said body facilitating disengagement of said loop from said finger.

DETAILED DESCRIPTION OF THE INVENTION

Figure 1:
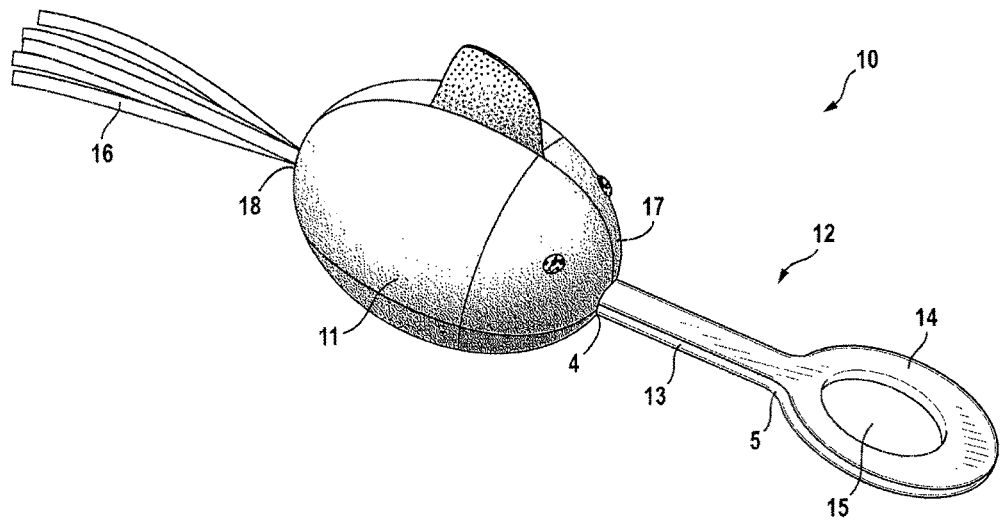
FIG. 1 is a perspective view of the present invention in the form of a fish-like stuffed toy.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning to FIG. 1, pet toy 10 comprises a body 11, in this instance, in the general shape of a fish having head section 17 and tail section 18. Stretchable member 12 extends from and is fixedly attached to head section 17, the stretchable member being an elastomer.

Stretchable member 12 is comprised of web 13 having first and second ends 4 and 5, first end 4 being appended to head section 17 and second end 5 transitioning into loop 14 having opening 15, sized to receive the finger of a user.

Figure 2:
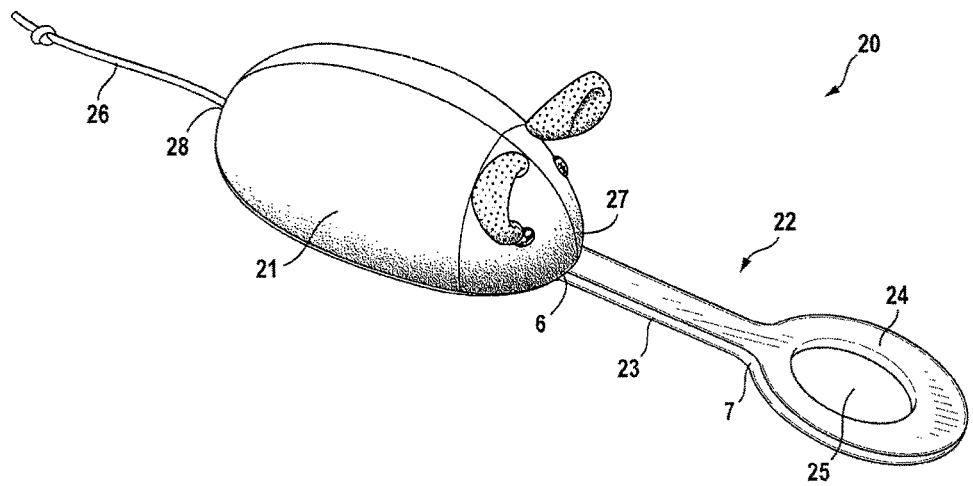
FIG. 2 is a perspective view of the present invention in the form of a mouse-like stuffed toy.

Similarly, FIG. 2 is fundamentally the pet toy of FIG. 1, however, in this instance, the pet toy includes body section 21 in the general shape of a mouse. FIGS. 1 and 2 have been provided in order to emphasize the notion that the present invention can be of virtually any configuration although one in the shape of a recognizable animal is considered preferable.

Turning again to FIG. 2, body 21 is provided with head section 27 and tail section 28 and fixedly attached to head section 27 is stretchable member 22 being an elastomer comprising web 23 having first and second ends 6 and 7, respectively, first end 6 being appended to head section 27 and second end 7 transitioning to loop 24 having opening 25 to receive the finger of a user.

It is contemplated that in use, a pet owner would insert a finger such as an index finger through openings 15 or 25 and pull back on bodies 11 or 21 thus stretching web portions 13 or 23 and, being elastomeric, will stretch much like rubber. A user may also wish to pull back on tails 16 or 26 although when elastomeric webs 13 or 23 are under high tension, tails 16 or 26 may dislodged from bodies 11 or 21 and, as a consequence, it is preferable that a user grasp the body portions of the pet toy rather than their tails. When body portions 11 or 21 are released, loops 14 or 24 releases from a user's finger whereupon the pet toys are launched.

Although stretchable members 12 and 22 can be composed of any elastomer, it is been found that Kraton®, a styrenic block copolymer, sold by Kraton Polymers U.S. LLC is ideally suited for use herein.

When in use, one would generally employ the present pet toy proximate to a pet. If a dog, one would generally use the toy in an outdoor area, such as a lawn or field such that upon launch, the dog would track the trajectory of the toy and fetch it repeatedly as it would a ball or stick or similar object. If the present pet toy is to be used with a cat, generally the toy would be launched a much shorter distance where the cat, in its proximity, would express its natural instinct to pounce on the toy as it would a moving object, particularly if the cat believes that it is a bird or rodent or similar prey. In either case, preferably, bodies 11 and 21 should consist of an outer shell and stuffing contained therein.

Clearly, through the use of elastomeric stretchable members 12 and 22, one is able to launch the present pet toy a much greater distance than would be the case if one was to merely grab body portions 11 or 21 and heave them as one would throw a ball or similar object. Further, as dogs generally need to repeatedly fetch heaved objects, the present invention reduces muscle strain which would otherwise set in if a similar pet toy or ball was simply repeatedly thrown.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A pet toy consisting of a body and a stretchable member extending from and fixedly attached thereto, said stretchable member being an elastomer in the form of a web having first and second ends, said first end being appended to said body and said second end transitioning to a loop, said loop having an opening sized to receive a finger of a user.

2. The pet toy of claim 1 wherein said web is expandable by inserting the finger of the user into said loop while increasing the distance of said body from said loop.

3. The pet toy of claim 2 wherein said loop is sized such that upon release of said body portion, said loop releases from the finger of a user whereupon said pet toy is launched by said user.

4. The pet toy of claim 1 wherein said elastomer comprises a styrene block copolymer.

5. The pet toy of claim 1 wherein said body comprises an outer shell and stuffing contained therein.

\* \* \* \* \*